(12) United States Patent
Kim et al.

(10) Patent No.: US 9,001,507 B2
(45) Date of Patent: Apr. 7, 2015

(54) MOBILE TERMINAL

(71) Applicant: LG Electronics Inc., Seoul (KR)

(72) Inventors: Taesun Kim, Cheonan (KR); Seulbitna Lee, Yangpyeong-Gun (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 13/652,538

(22) Filed: Oct. 16, 2012

(65) Prior Publication Data

US 2013/0182379 A1 Jul. 18, 2013

(30) Foreign Application Priority Data

Jan. 17, 2012 (KR) .......................... 10-2012-005306
Jan. 19, 2012 (KR) .......................... 10-2012-006208

(51) Int. Cl.
*G06F 1/16* (2006.01)
*H04M 1/02* (2006.01)

(52) U.S. Cl.
CPC .................................. *H04M 1/0283* (2013.01)

(58) Field of Classification Search
CPC .................................................... H04M 1/0283
USPC ......... 361/679.01, 679.55, 679.56; 455/575.1
See application file for complete search history.

(56) References Cited

U.S. PATENT DOCUMENTS

| | | | | |
|---|---|---|---|---|
| 7,016,184 | B1* | 3/2006 | Oneyama et al. | 361/679.27 |
| 7,443,566 | B2* | 10/2008 | Lerenius et al. | 359/265 |
| 7,826,219 | B2* | 11/2010 | Chien et al. | 361/679.55 |
| 8,416,568 | B2* | 4/2013 | Tian et al. | 361/679.55 |
| 8,514,553 | B2* | 8/2013 | Wang | 361/679.01 |
| 8,527,020 | B2* | 9/2013 | Tho et al. | 455/575.1 |
| 8,638,549 | B2* | 1/2014 | Garelli et al. | 361/679.27 |
| 8,675,358 | B2* | 3/2014 | Shin et al. | 361/679.55 |
| 2007/0008684 | A1* | 1/2007 | Anderson et al. | 361/681 |
| 2008/0074833 | A1* | 3/2008 | Chien et al. | 361/683 |
| 2008/0074834 | A1* | 3/2008 | Chien et al. | 361/683 |
| 2010/0002377 | A1* | 1/2010 | Kim | 361/679.55 |
| 2010/0046162 | A1* | 2/2010 | Chen et al. | 361/679.55 |

* cited by examiner

*Primary Examiner* — Lisa Lea Edmonds
(74) *Attorney, Agent, or Firm* — KED & Associates, LLP

(57) ABSTRACT

A mobile terminal is provided. The mobile terminal may include a window that at least partially covers the terminal body and is made of a light transmitting material, a non-transparent portion covering a portion of a surface of the window, a transparent portion provided within the non-transparent portion on the window to form a front image, and a front pattern plate mounted on a case of the mobile terminal to at least partially expose the pattern through the transparent portion.

23 Claims, 12 Drawing Sheets

MOBILE TERMINAL

CROSS-REFERENCE TO RELATED APPLICATION(S)

This application claims priority under 35 U.S.C. §119 to Korean Application Nos. 10-2012-0005306 filed on Jan. 17, 2012 and 10-2012-0006208 filed on Jan. 19, 2012, whose entire disclosures are hereby incorporated by reference.

BACKGROUND

1. Field

This relates to a mobile terminal.

2. Background

A mobile terminal may be a portable electronic device having at least one of a voice and video communication function, an information input and/or output function, a data storage function, and other such functions.

More diversified functions may be provided in a terminal is implemented in the form of a multimedia player having various functions such as capturing still or moving images, playing music or video files, gaming, receiving broadcast, and the like.

Mobile terminals may include various design forms including, for example, structural modifications and improvements for enhancing an external appearance of the mobile terminal.

For example, an image such as an icon, a logo, and the like may be provided on the mobile terminal to enhance a visual effect.

BRIEF DESCRIPTION OF THE DRAWINGS

The embodiments will be described in detail with reference to the following drawings in which like reference numerals refer to like elements wherein.

DETAILED DESCRIPTION

Figure 1:
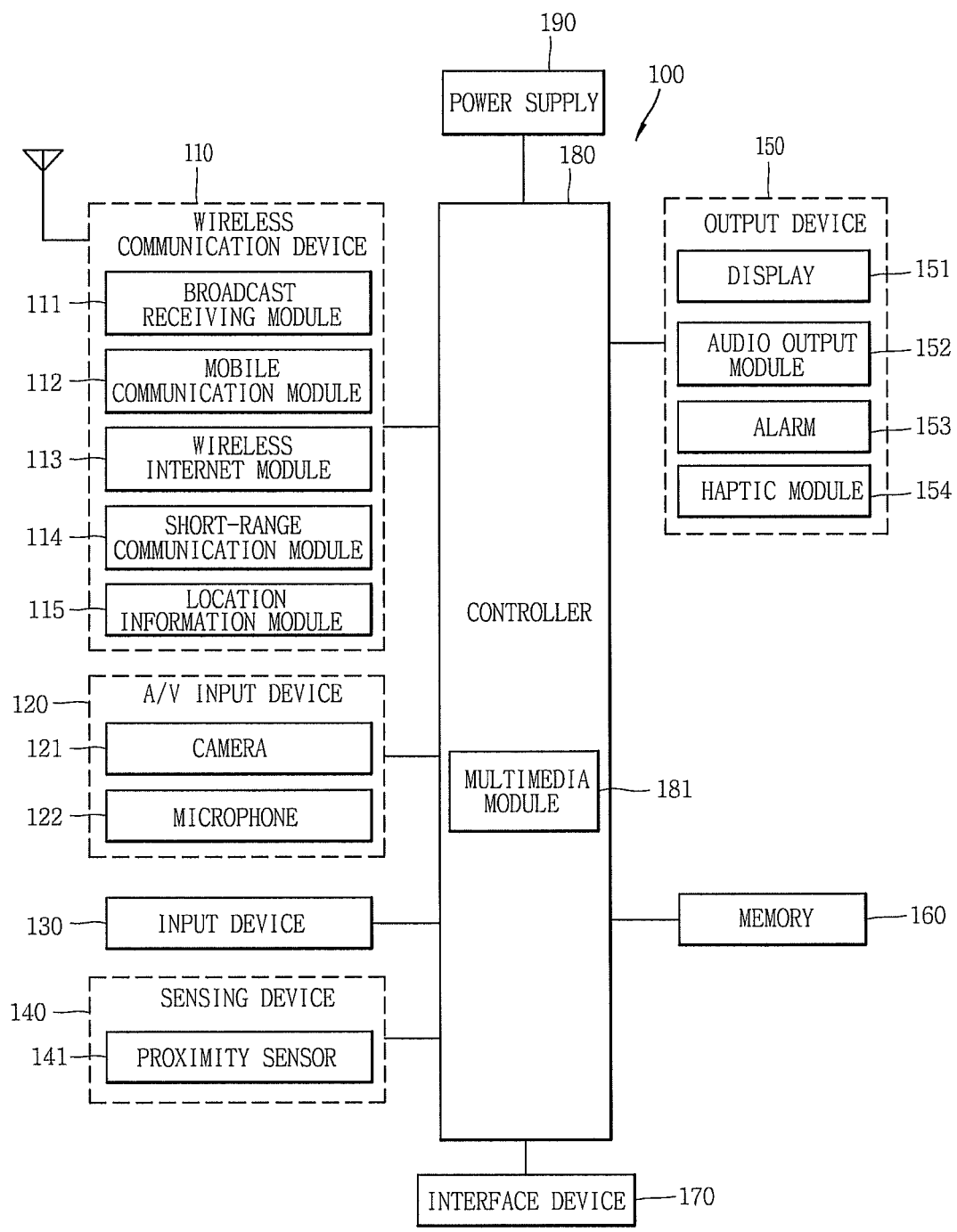
FIG. 1 is a block diagram of a mobile terminal in accordance with an embodiment as broadly described herein.

Hereinafter, a mobile terminal in accordance with various embodiments will be described in more detail with reference to the accompanying drawings. Wherever possible, like/similar reference numerals will be used for like/similar components irrespective of different embodiments, and an expression in the singular form may apply to a similar expression in the plural form unless otherwise indicated.

A mobile terminal as embodied and broadly described herein may include a portable phone, a smart phone, a laptop computer, a digital broadcast terminal, a personal digital assistant (PDA), a portable multimedia player (PMP), a navigation device, and the like. However, it may be easily understood by one skilled in the art that features as embodied and broadly described herein may also be applicable to a stationary terminal such as a digital TV, a desktop computer, and the like.

As shown in FIG. 1, a mobile terminal 100 as embodied and broadly described herein may include a wireless communication device 110, an audio/video (A/V) input device 120, a user input device 130, a sensing device 140, an output device 150, a memory 160, an interface device 170, a controller 180, a power supply 190, and the like. However, the constituent elements as illustrated in FIG. 1 are not necessarily required, and the mobile terminal may be implemented with a greater or less number of elements than those illustrated.

The wireless communication device may include one or more elements that may provide for radio communication between the mobile terminal 100 and a wireless communication system, or that may provide for radio communication between the mobile terminal 100 and a network in which the mobile terminal 100 is located. For example, the wireless communication device 110 may include a broadcast receiving module 111, a mobile communication module 112, a wireless Internet module 113, a short-range communication module 114, a location information module 115, and the like.

The broadcast receiving module 111 may receive broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 may be suitable for numerous other broadcast systems that provide a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 may provide for wireless Internet access. The wireless Internet module 113 may be built-in or externally installed on the mobile terminal 100 and may employ a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 may provide for short-range communication and may employ short-range communication technology including Bluetooth, Radio Frequency IDentification (RFID), Infrared Data Association (IrDA), Ultra WideBand (UWB), ZigBee, and the like.

The location information module 115 may check and/or acquire a location of the mobile terminal, such as, for example, a GPS module.

Referring to FIG. 1, the A/V (audio/video) input device 120 receives an audio or video signal, and the A/V (audio/video) input device 120 may include a camera 121 and a microphone 122. The camera 121 processes a image frame, such as still picture or video, obtained by an image sensor in a video phone call or image capturing mode. The processed image frame may be displayed on a display module 151.

The image frames processed by the camera 121 may be stored in the memory 160 or transmitted to an external device through the wireless communication device 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electronic voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input device 130 may generate input data to control an operation of the terminal. The user input device 130 may be configured by including a keypad, a dome switch, a touch pad (pressure/capacitance), a jog wheel, a jog switch, and the like.

The sensing device 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing device 140 takes charge of a sensing function associated with whether or not power is supplied from the power supply 190, or whether or not an external device is coupled to the interface device 170. On the other hand, the sensing device 140 may include a proximity sensor 141.

The output device 150 is configured to provide an output for audio signal, video signal, or alarm signal, and the output device 150 may include the display module 151, an audio output module 152, an alarm device 153, a haptic module 154, and the like.

The display module 151 may display (output) information processed in the mobile terminal 100. For example, when the mobile terminal 100 is in a phone call mode, the display module 151 may display a User Interface (UI) or a Graphic User Interface (GUI) associated with a call. When the mobile terminal 100 is in a video call mode or image capturing mode, the display module 151 may display a captured image and/or received image, a UI or GUI.

The display module 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display module 151 of the terminal body.

In certain embodiments, two or more display modules 151 may be implemented according to a configured aspect of the portable terminal 100. For instance, a plurality of the displays 151 may be arranged on one surface to be spaced apart from or integrated with each other, or may be arranged on different surfaces.

When the display module 151 and a touch sensitive sensor (referred to as a "touch sensor") have an interlayer structure, the structure may be referred to as a "touch screen". The display module 151 may be used as an input device rather than an output device. The touch sensor may be implemented as a touch film, a touch sheet, a touch pad, and the like.

The touch sensor may be configured to convert changes of a pressure applied to a specific part of the display module 151, or a capacitance occurring from a specific part of the display module 151, into electric input signals. Also, the touch sensor may be configured to sense not only a touched position and a touched area, but also a touch pressure.

When there is a touch input to the touch sensor, the corresponding signal(s) are transmitted to a touch controller. The touch controller processes the received signals, and then transmits corresponding data to the controller 180. Accordingly, the controller 180 may sense which region of the display module 151 has been touched.

Referring to FIG. 1, a proximity sensor 141 may be arranged at an inner region of the portable terminal 100 covered by the touch screen, or near the touch screen. The proximity sensor may sense presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, simply for ease of explanation and illustration, a situation in which a pointer is positioned to be proximate to the touch screen without contact will be referred to as a "proximity touch", whereas a situation in which the pointer substantially comes in contact with the touch screen will be referred to as a "contact touch". The position corresponding to the proximity touch of the pointer on the touch screen may correspond to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication device 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display module 151 or the audio output device 152, the display module 151 and the audio output module 152 may be included as part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. In certain embodiments, two or more haptic modules 154 may be implemented according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface device 170 may generally be implemented to interface the portable terminal with external devices. The interface device 170 may allow data reception from an external device, power delivery to each component in the portable terminal 100, or data transmission from the portable terminal 100 to an external device. The interface device 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

The interface device 170 may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Figure 2A:
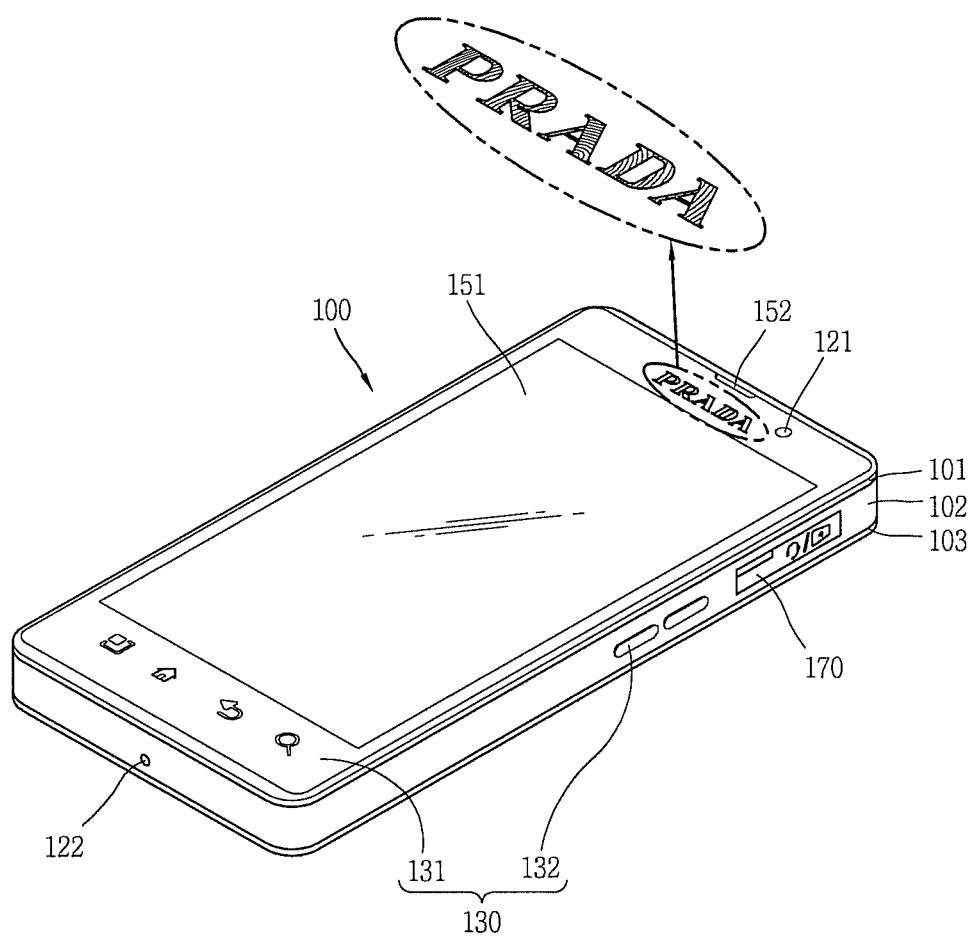
FIG. 2A is a front perspective view of an exemplary mobile terminal as embodied and broadly described herein.

FIG. 2A is a front perspective view of an exemplary mobile terminal as embodied and broadly described herein.

Referring to FIG. 2, the mobile terminal 100 disclosed herein is provided with a bar-type terminal body. However, the present disclosure is not only limited to this type of terminal, but also applicable to various structures of terminals such as slide type, folder type, swivel type, swing type, and the like, in which two and more bodies are combined with each other in a relatively movable manner.

The terminal body includes a case (hereinafter, referred to as a casing, housing, cover, etc.) forming an external appearance of the terminal. In this embodiment, the case may be divided into a front case 101 and a rear case 102 for covering a surface opposite the front case 101. At least one intermediate case may be additionally disposed between the front case 101 and the rear case 102, and a battery cover 103 for covering the power supply 190 may be detachably provided at the rear case 102.

Various electronic components may be incorporated in a space formed between the front case 101 and the rear case 102. The cases may be formed by, for example, injection-molding a synthetic resin, or, for example, of a metal material such as stainless steel (STS), titanium (Ti), aluminum (Al) or the like.

A display 151, a first audio output device 152, a first camera 121, and a signal input device 130, and the like may be formed at a front surface of the terminal body, and an audio input device 122 and an interface device 170, and the like may be disposed at lateral surfaces thereof.

The display 151 may include a liquid crystal display (LCD) module, an organic light emitting diode (OLED) module, an e-paper, and the like for expressing information in a visual manner.

The display 151 may include a touch sensing device allowing for input by means of a touch method. When so configured, when there is a touch to any one point on the display 151, content corresponding to the touched location is received. The content received by a touch method may be a character or numeral, a menu item that can be instructed or designated in various modes, and the like Such a touch sensing device may be formed of a light transmitting material to allow the display 151 to be seen, and may include a structure for enhancing the visibility of a touch screen at a bright place. Referring to FIG. 1, the display 151 occupies most of the front surface of the front case 102.

The audio output device 152 and the camera 121 are disposed on a region adjacent to one of both end portions of the display 151, and the user input device 131 and the audio input device 122 are disposed on a region adjacent to the other end thereof. The user interface 132 and the interface device 170, and the like, may be disposed on a lateral surface of the front case 101 and the rear case 102.

The first audio output device 152 may be implemented in the form of a receiver for transferring a telephone call sound to the user's ear or a loud speaker for outputting various alarm sounds or reproduced sounds of the multimedia.

The first camera 121 processes image frames such as still or moving images obtained by the image sensor in a video call mode or capture mode. The processed image frames may be displayed on the display 151.

The signal input device 130 is manipulated to receive a command for controlling the operation of the mobile terminal 100, and may include a plurality of manipulation devices 131, 132. The manipulation devices 131, 132 including the user input device 131 and the user interface 132 may be commonly designated as a manipulating portion, and numerous methods may be employed if it is a tactile manner allowing the user to perform manipulation with a tactile feeling.

The content received by the first and/or second manipulation devices 131, 132 may be set in various ways. For example, the first manipulation device 131 may be used to receive a command such as start, end, scroll, or the like, and the second manipulation device 132 may receive a command, such as controlling a volume level being outputted from the first audio output module 152, or switching into a touch recognition mode of the display 151.

The audio input device 122 may be implemented in the form of a microphone, for example, to receive the user's voice, other sounds, or the like.

The interface device 170 serves as a path allowing the mobile terminal 100 to exchange data with external devices. For example, the interface device 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface device 170 may be implemented in the form of a socket for accommodating an external card such as Subscriber Identification Module (SIM) or User Identity Module (UIM), and a memory card for information storage.

Figure 2B:
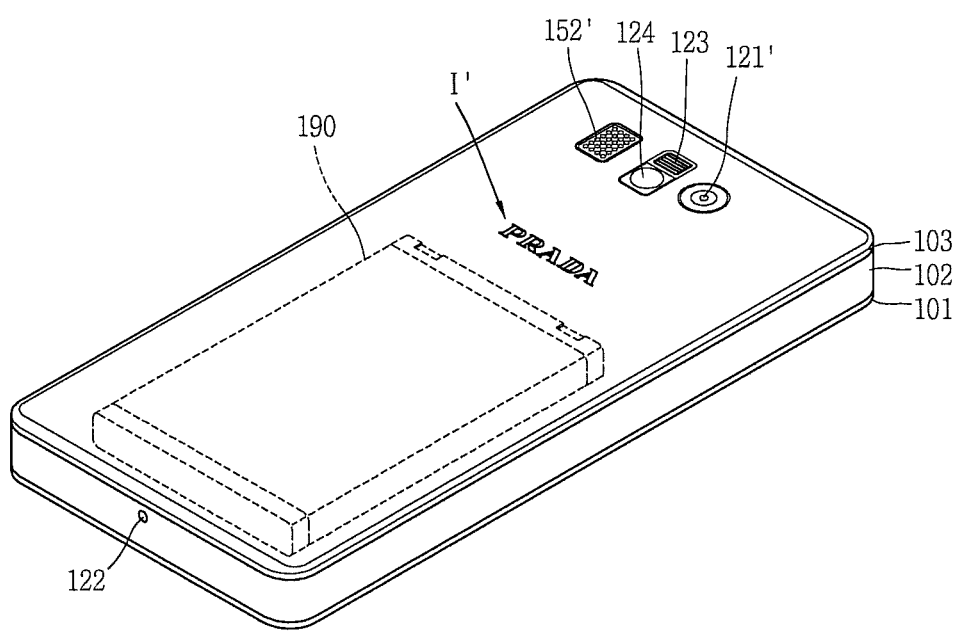
FIG. 2B is a rear perspective view of the exemplary mobile terminal shown in FIG. 1.

FIG. 2B is a rear perspective view of the mobile terminal 100 shown in FIG. 1.

Referring to FIG. 2B, a second camera 121' may be additionally mounted at a rear surface of the terminal body. The second camera 121' has an image capturing direction, which is substantially opposite to the direction of the first camera 121 (refer to FIG. 1), and may have a different pixel capacity than that of the first camera 121.

For example, the first camera 121 may have a relatively small pixel capacity, enough not to cause difficulty when the user captures his or her own image for transmission to another party during a video call or the like, and the second camera 121' may have a relatively large pixel capacity to capture a general object that is not sent immediately. The first and the second cameras 121, 121' may be provided in the terminal body in a rotatable and pop-up/pop-out manner.

Furthermore, a flash 123 and a mirror 124 may be additionally disposed adjacent to the second camera 121'. The flash 123 illuminates light toward an object when capturing the object with the second camera 121'. The mirror 124 allows the user to look at his or her own image, or the like, in a reflected way when capturing himself or herself (in a self-portrait mode) by using the second camera 121'.

A second audio output device 152' may be additionally disposed at a rear surface of the terminal body. The second audio output device 152' together with the first audio output device 152 (refer to FIG. 1) can implement a stereo function, and may be also used to implement a speaker phone mode during a phone call.

An antenna (not shown) may be additionally disposed at a lateral surface of the terminal body in addition to an antenna for phone call. The antenna constituting part of the broadcast receiving module may be provided in the terminal body in a retractable manner.

A power supply 190 for supplying power to the mobile terminal 100 may be mounted on the terminal body. The power supply 190 may be implemented with a battery for converting chemical energy into electrical energy, and the battery may be incorporated into the terminal body, or configured in a detachable manner on the terminal body.

Front or rear images (I, I'), such as, for example, a trademark, a service mark, a logo, and the like, indicating, for example, a manufacturer or mobile communication operator, and the like, may be formed on an outer portion (for example, window, battery cover 103, etc.) of the terminal body. Hereinafter, a mobile terminal 100 including such a visual effect on the front and rear images (I, I') will be described in more detail.

Figure 3:
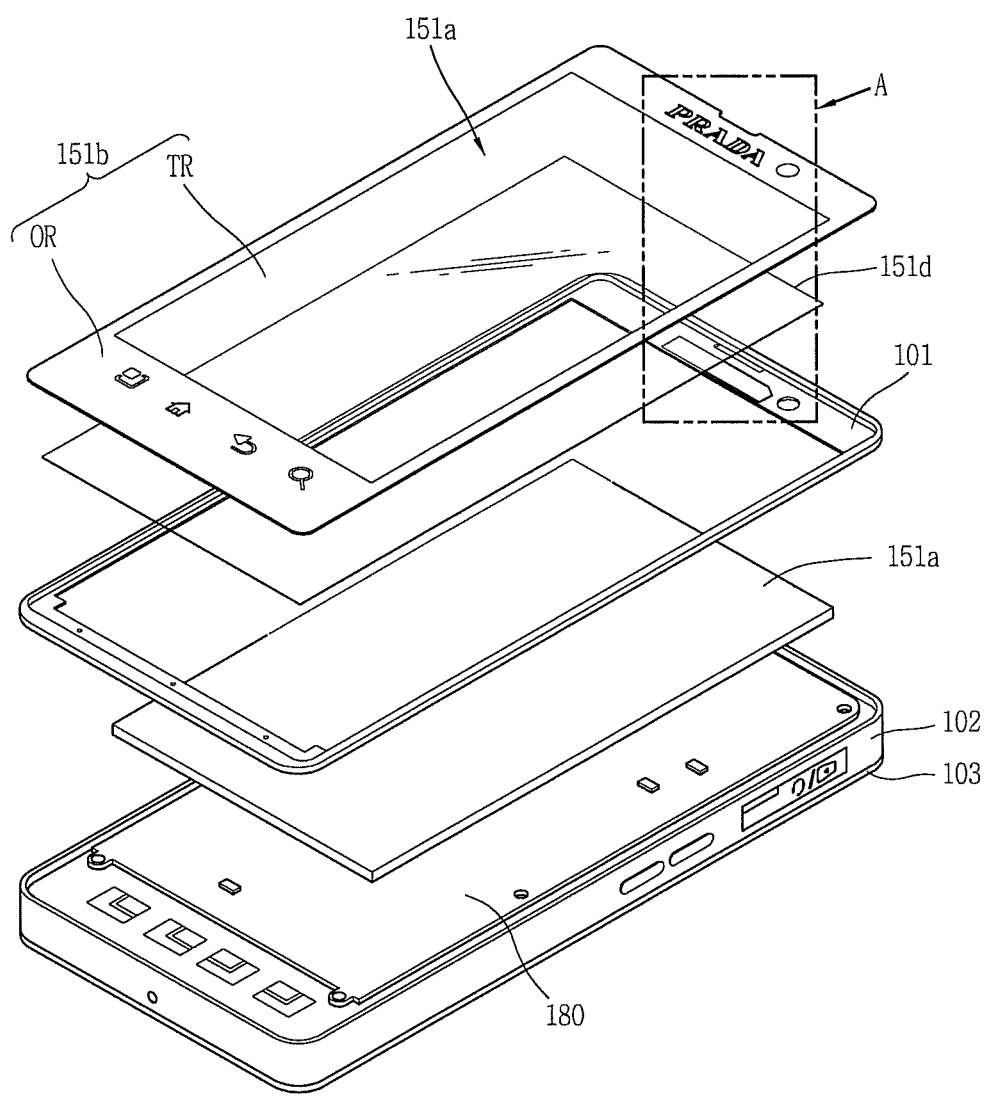
FIG. 3 is an exploded perspective view of the mobile terminal shown in FIG. 2B.
Figure 4:
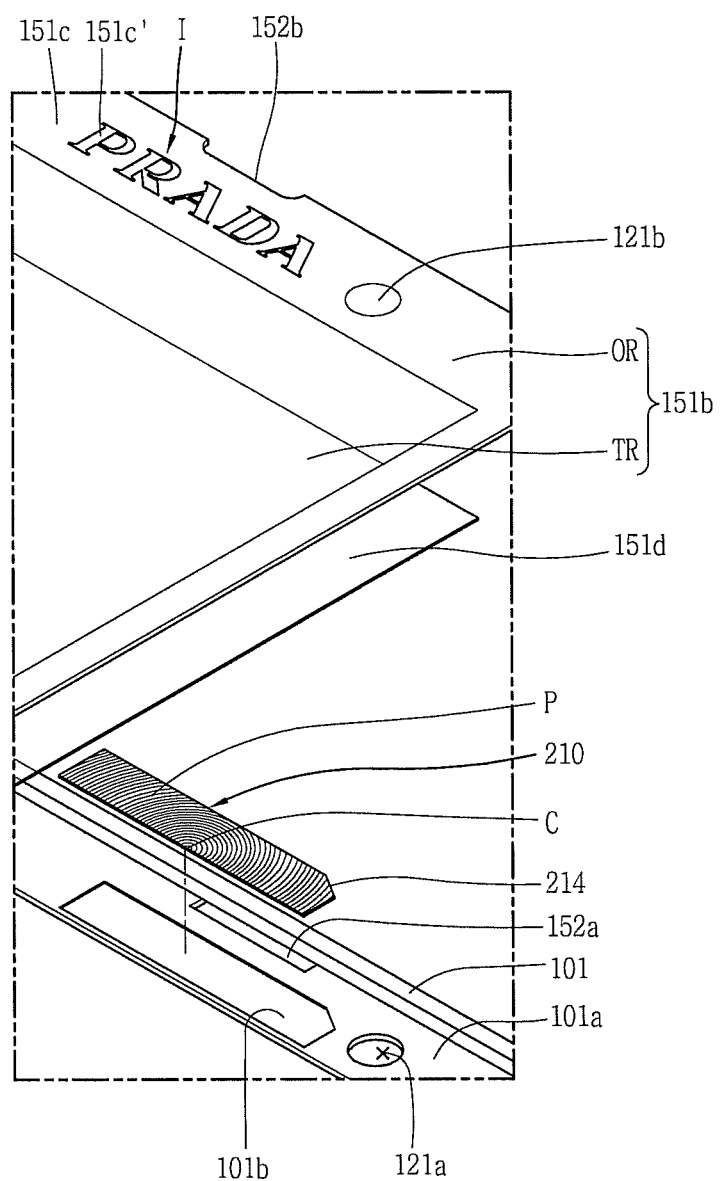
FIG. 4 is an enlarged view of a portion A illustrated in FIG. 3.
Figure 5:
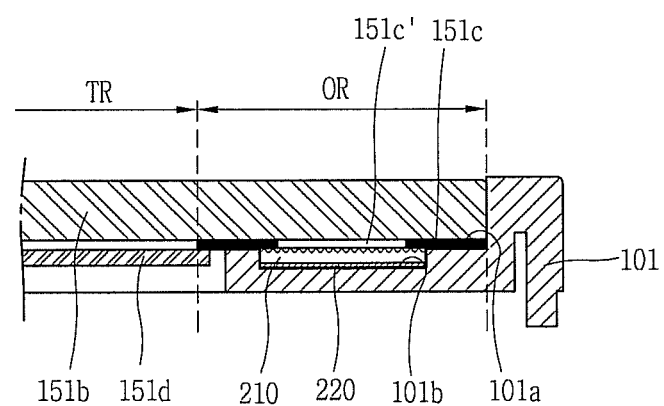
FIG. 5 is a cross-sectional view of the portion A of the mobile terminal according to an embodiment shown in FIG. 3.

Referring to FIGS. 3 through 5, the mobile terminal may include a circuit board 180, a window 151b, and a display 151a.

The circuit board 180 is disposed at an inner portion of the terminal body. The circuit board 180 may be mounted on the rear case 102 or mounted on a separate internal structure as illustrated in the drawing. The circuit board 180 may be configured as an example of the controller for operating various functions of the mobile terminal 100.

The display 151a electrically connected to the circuit board 180 is disposed at a surface of the circuit board 180. The display 151a may have an area corresponding to a light transmitting region of the window 151b. Through this, the user may recognize visual information being output from the display 151a at the outside.

The front case 101 may have a bezel portion 101a recessed at a surface thereof to allow part of the window 151b to be placed thereon. Contrary to the example, the bezel portion 101a may be separately provided from the front case 101.

A camera hole 121a corresponding to the first camera 121 and an audio hole 152a corresponding to the first audio output device 152 are formed at the bezel portion 101a. The audio hole 152a may be disposed adjacent to a lateral wall of the front case 101.

The window 151b is combined with the bezel portion 101a. The window 151b may be formed of a light transmitting material, for example, a light transmitting synthetic resin, a tempered glass, and the like.

The window 151b may include a non-transparent or low light transmittance material in some regions forming a non-transparent portion 151c disposed to cover a surface thereof. The non-transparent portion 151c may be implemented such that a printing layer is printed on a surface of the window 151b or a pattern film (not shown) additionally covers the window 151b.

The non-transparent portion 151c may cover an edge of the window 151b to form an opaque region (OR). Through this, the window 151b is partitioned into an opaque region (OR) at the edge thereof and a transparent region (TR) at the center thereof surrounded by the opaque region (OR). The transparent region (TR) is formed to correspond to the display 151a to allow visual information being output from the display 151a to be viewed from the outside.

The non-transparent portion 151c may be formed with the exception of a portion corresponding to the camera hole 121a to form an image window 121b. Furthermore, a groove 152b may be formed at a lateral surface of the window 151b disposed to face a lateral surface of the front case 101 to form an assembly gap. According to the foregoing structure, a sound generated from the first audio output device 152 may be emitted along an assembly gap between the front case 101 and window 151b, and an external appearance of the mobile terminal 100 may look more simple since a hole independently formed to output audio is not shown on the outside.

As described above, the display 151a and window 151b may be configured as a display device 151 (refer to FIG. 1).

A touch sensor 151d may be mounted on the window 151b to sense a touch input. The touch sensor 151d is disposed to correspond to the transparent region (TR) of the window 151b, and formed on sense a touch position to the window 151b. The touch sensor 151d may extend to the opaque region (OR) at a lower end of the window 151b. The touch sensor 151d may be electrically connected to the circuit board 180 through a flexible circuit board.

The touch sensor 151d may be formed of a light transmitting material, and configured to convert a change of pressure, voltage, capacitance, or the like generated from a specific portion of the window 151b into an electrical input signal. As an example of the touch sensor 151d may be an electrostatic capacitance type sensor.

A transparent portion 151c' may be formed within the region occupied by the non-transparent portion 151c for forming a front image (I). The transparent portion 151c' may be implemented such that the non-transparent portion 151c is printed on the window 151b except in the region of the transparent portion 151c' along the opaque region (OR) of the window 151b. The transparent portion 151c' may be mask-processed prior to printing the non-transparent portion 151c to form a specific front image (I) within the opaque region (OR) at an edge thereof.

In other embodiments, the transparent portion 151c' may be implemented such that a pattern film is formed with an opaque region and a transparent region to define a front image (I).

The transparent portion 151c' may be formed at a portion corresponding to the bezel portion 101a, and implemented as a front image (I) such as a specific trademark, a service mark, a logo, and other designs as appropriate.

A front pattern plate 210 having a specific pattern (P) is disposed at a rear surface of the non-transparent portion 151c, at a position corresponding to the transparent portion 151c'. At least part of the front pattern plate 210 is exposed through the transparent portion 151c' to provide an appearance of texture and/or a feeling of a material to the front image (I).

In other words, the transparent portion 151c' may be implemented with a color different from the non-transparent portion 151c to see and/or allow the user to feel the difference of color as well as the specific pattern (P) applied within the front image (I).

The front pattern plate 210 may have a substantially rectangular shape with an asymmetric portion 214 in which an upper corner portion is cut thus forming a left/right asymmetric shape.

A receiving portion 101b for receiving the front pattern plate 210 is formed in a region corresponding to the transparent portion 151c' in the bezel portion 101a. The receiving portion 101b may be formed in a left/right asymmetric shape to correspond to the front pattern plate 210, to provide for proper alignment and placement of the front pattern plate 210 during assembly. According to the foregoing structure, the front pattern plate 210 is fabricated such that a portion formed with the pattern (P) is always located toward the transparent portion 151c', thereby minimizing the time required for fabrication and enhancing the process yield.

An adhesive tape 220 may be adhered to a rear surface of the front pattern plate 210, namely, a surface opposite the front face formed with the pattern (P). Accordingly, the front pattern plate 210 is inserted into the receiving portion 101b and thus firmly fixed to the front case 101. The inserted front pattern plate 210 is substantially co-planar an upper surface of the bezel portion 101a and thus does not receive a concentrated stress due to a step when the window 151b is placed on the bezel portion 101a.

Figure 6:
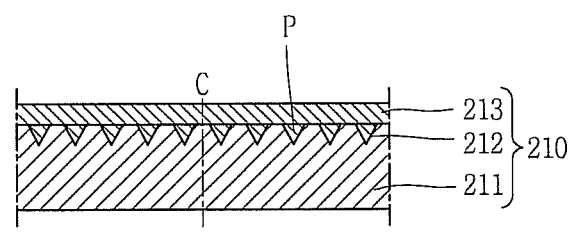
FIG. 6 is a cross-sectional view of a front pattern plate shown in FIG. 4.

FIG. 6 is a cross-sectional view taken at the front pattern plate 210 shown in FIG. 4.

As discussed above, a specific pattern (P) is provided at a surface of the front pattern plate 210 exposed through the transparent portion 151c'. A surface of the front pattern plate 210 may be formed with a concave or convex profile to make the pattern (P). The front image (I) formed by the transparent portion 151c' may be, for example, a logo expressed with the feeling of a patterned material by the front pattern plate 210.

In certain embodiments, the front pattern plate 210 may include a base 211 and a pattern portion 212.

As a basic material of the front pattern plate 210, the base 211 may be formed of a different kind of material from the window 151b. The base may be formed of a metal (for example, stainless steel (STS)), synthetic resin (for example, polycarbonate (PC)), or the like.

The pattern portion 212 may be formed with a concave or convex profile cut at a surface of the base 211 to make a specific pattern (P). Light incident to the front pattern plate 210 is reflected in various directions according to the pattern, thereby allowing the user to have the feeling of a material, the feeling of depth, and the like.

The front pattern plate 210 may further include a coating layer 213 disposed to cover the pattern portion 212. The coating layer 213 may provide gloss or color to the pattern (P). In other words, the front pattern plate 210 may have a different color, material feeling and the like than the base 211 itself by processing the surface of the front pattern plate 210. The coating layer 213 may be formed by a physical vapor deposition (PVD) method or other method as appropriate.

Figure 7:
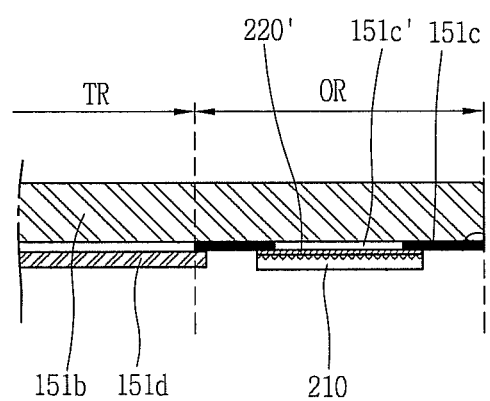
FIG. 7 is a cross-sectional view of the portion A of the mobile terminal according to another embodiment.

FIG. 7 is a cross-sectional view portion A of the mobile terminal shown in FIG. 3, according to another embodiment.

In the foregoing drawings and description thereof, embodiments in which the front pattern plate 210 is mounted on the front case 101 have been described.

As shown in the embodiment of FIG. 7, the front pattern plate 210 may be directly mounted at a rear surface of the window 151b (more particularly, a portion corresponding to the transparent portion 151c' within the non-transparent portion 151c) and thus may be configured such that at least part of the pattern (P) is exposed through the transparent portion 151c'.

At this time, an adhesive layer 220' may be disposed between the window 151b and the front pattern plate 210 to combine them with each other. An optical clear adhesive (OCA), a super view resin (SVR) or the like may be used for the adhesive layer 220'.

According to the present disclosure having the foregoing configuration, the transparent portion 151c' is defined by the confines of the non-transparent portion 151c to form a front image (I), and at least part of the pattern (P) formed on the front pattern plate 210 is exposed through the transparent portion 151c' to provide the feeling of a material to the front image (I).

The front image (I) formed using the front pattern plate 210 is not shown in FIG. 7, but it may be formed at an outer portion of the mobile terminal 100 constituting a rear surface of the mobile terminal 100.

Hereinafter, a structure of the image (I) formed at a rear surface of the mobile terminal 100 will be described in detail.

Figure 8:
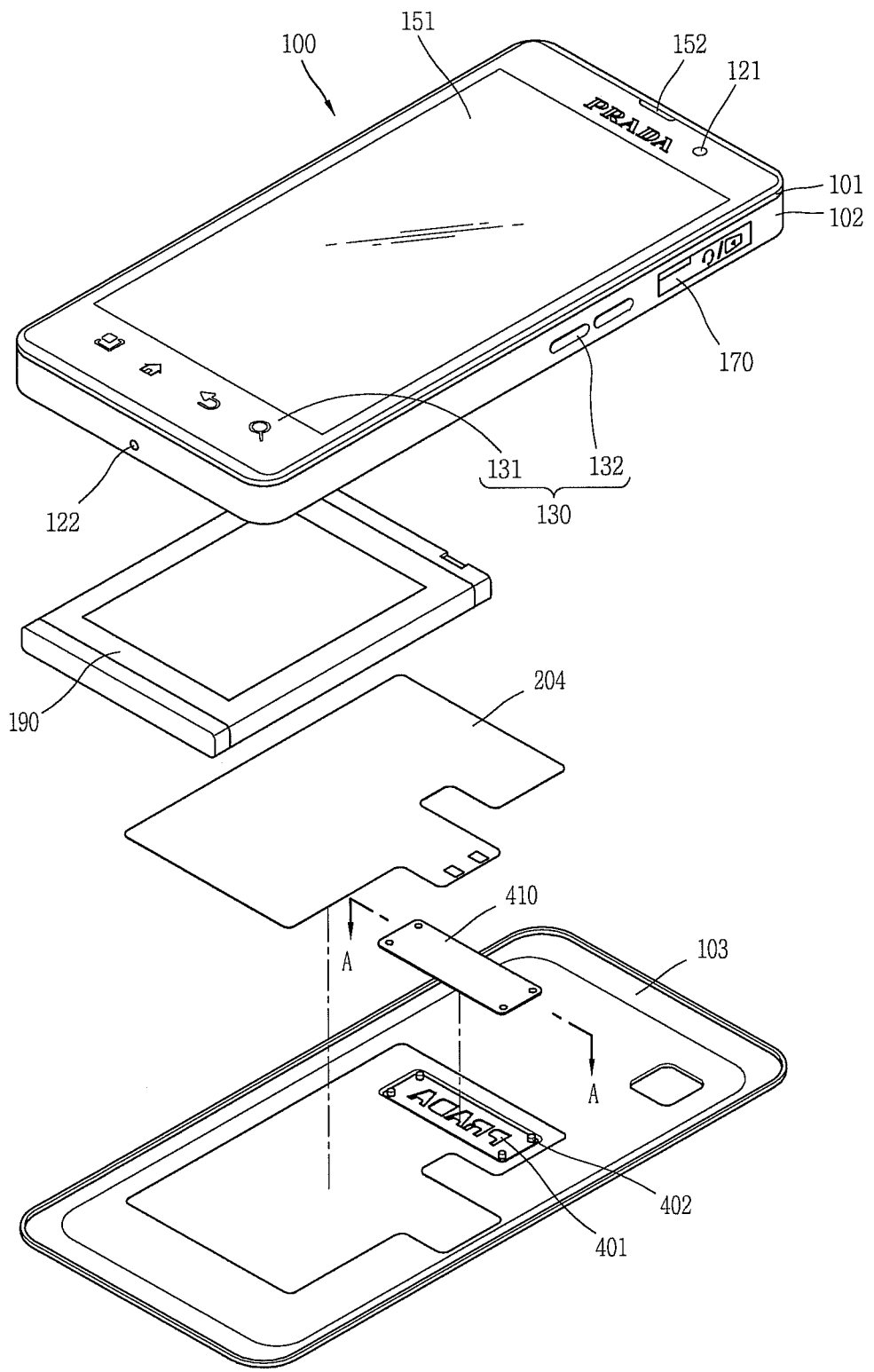
FIG. 8 is an exploded view of the mobile terminal and battery cover shown in FIG. 2B.
Figure 9:
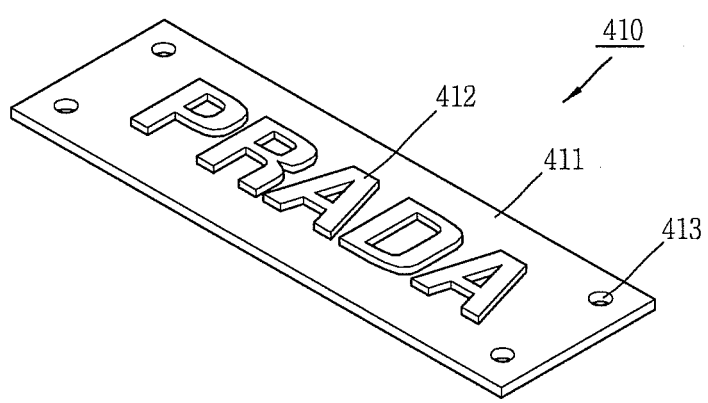
FIG. 9 is a conceptual view of a rear pattern plate.

FIG. 8 is an exploded perspective view of the mobile terminal and battery cover shown in FIG. 2B, and FIG. 9 is a perspective view of an exemplary rear pattern plate.

Referring to FIGS. 8 and 9 in this embodiment, the battery cover 103 is in the form of a case 103 that defines an external appearance of the terminal body, with a rear pattern plate 410 and a cover portion 204 disposed at an inner surface facing the terminal body of the case 103.

Referring to FIG. 9, the rear pattern plate 410 may include a first region 411 and a second region 412. The first and the second region 411, 412 may be formed as an integral body. The second region 412 is exposed on an outer surface of the battery cover 103 to form a pattern.

The rear pattern plate 410 may be formed of a metal that may reflect light, and thus the pattern may be conspicuously formed at an outer surface of the mobile terminal, thereby enhancing the quality and appearance of the external body.

The case 103 has an opening portion 401 formed having substantially the same form as the shape of the pattern. In other words, the opening portion 401 may be formed along an edge of the pattern portion. The opening portion 401 may be formed by a numerical control (NC) process.

The first region 411 may be formed in a plate shape. The second region 412 is protruded from a surface of the first region 411. The second region 412 may be formed to make a preset pattern. The pattern may be formed with various features, logos, characters, and the like.

The second region 412 is formed to be inserted into the opening portion 401. The height of the second region 412 protruded from the first region 411 may be substantially the same as the thickness of the case 103. In other words, a surface of the second region 412 exposed to the outside may be substantially co-planar with an outer surface of the case 103.

However, in alternative embodiments, the second region 412 may be depressed into or protruded from an outer surface of the case 103.

Accordingly, it may be possible to minimize a gap formed between the opening portion 401 and the second region 412. The high-quality feeling of the external appearance of the mobile terminal may be enhanced by preventing pollutants from being introduced into such a gap and enhancing a sense of unity between the case 103 and the rear pattern plate 410.

The first region 411 is positioned at an inner surface of the case 103. A recess portion formed to correspond to the first region 411 may be formed at an inner surface of the case 103. In other words, the first region 411 may be placed on the recess portion to be substantially co-planar with an inner surface of the case 103.

Furthermore, the movement of the first region 411 placed on the recess portion may be restricted to prevent the second region 412 from being released from the opening portion 401. Accordingly, the pattern portion 400 may be implemented in a stable manner.

Referring to FIGS. 8 and 9, at least one fixing hole 413 is formed in the first region 411, and at least one fixing protrusion 402 corresponding to the at least one fixing hole 413 may be formed on the case 103. When the rear pattern plate 410 is disposed at the case 103, the fixing protrusion 402 is inserted into the fixing hole 413 to align and fix the rear pattern plate 410 in place on the inner surface of the case 103.

Accordingly, the rear pattern plate 410 may be aligned and stably fixed to the case 103 by the fixing hole 413 and fixing protrusion 402.

The cover portion 204 is combined with a region of the case 103 to cover the rear pattern plate 410. The cover portion 204 may be formed separate from the case 103.

A groove may be formed to receive the cover portion 204 on the case 103. However, the cover portion 204 may be formed to be incorporated into the case 103 according to the fabrication process.

In certain embodiments, an antenna may be formed at the cover portion 204 to transmit and receive wireless signals at the outside of the mobile terminal. Alternatively, such an antenna may be separated from the rear pattern plate 410 to prevent an effect of the rear pattern plate 410 formed of the metal material.

Figure 10:
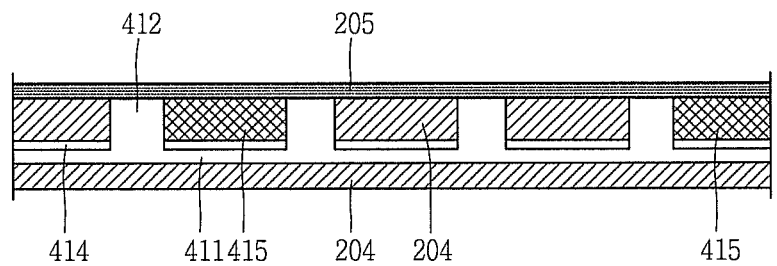
FIG. 10 is a cross-sectional view of a battery cover shown in FIG. 8 including a pattern portion according to an embodiment as broadly described herein.

FIG. 10 is a cross-sectional view of a battery cover including a pattern portion according to an embodiment as broadly described herein.

Referring to FIG. 10, an adhesive member 414, or adhesive layer 414, may be formed between the case 103 and the first region 411. The adhesive member 414 may be, for example, a heat activated tape that is cured by heat. The adhesive member 414 may be formed on the first region 411, excluding the second region 412. The rear pattern plate 410 may be stably fixed to the case 103 by the adhesive member 414.

Referring to FIGS. 9 and 10, the second region 412 may be formed with at least one closed loop. For example, a character "P" expressed by the second region 412 may include the one closed loop. As described above, the opening portion 401 is formed along an edge of the pattern. Accordingly, a region formed by the closed loop cannot be combined with the case 103.

A filling member 415 may be filled between the portions of second region 412 making the closed loop. The filling member may be, for example, ink. The filling member 415 may include a color different from the rear pattern plate 410 to clearly implement the shape of the rear pattern plate 410.

A protective layer 205 may be formed on at least one of the case 103 forming an external appearance of the mobile terminal, the second region 412, or the filling member 415.

The protective layer 205 may be formed of a light transmitting material to allow the second region 412 containing a metallic material to reflect light. Furthermore, the protective layer 205 may be formed with an anti-oxidation film to prevent the oxidation of the second region 412.

A battery cover including a pattern portion according to the present disclosure forms the opening portion 401 in a shape corresponding to the pattern portion on the case 103, and fixes the rear pattern plate 410 including the first and the second region 411, 412 to an inner surface of the case 103.

The pattern portion is assembled into an inner portion of the case 103, thereby solving a problem that the pattern portion 400 is separated from the case 103 or damaged. Furthermore, the second region 412 forms the same plane as the case 103 and thus a worry about the damage of the pattern portion 400 can be reduced and the outer surface thereof can be formed in a sleek manner, thereby implementing an attractive and tactile design.

When a rear pattern plate is adhered to a surface of the battery cover to form the pattern portion, the rear pattern plate may be separated or damaged by an external shock or friction.

Accordingly, a mobile terminal as embodied and broadly described herein may firmly form a pattern portion to enhance the high-quality feeling and exterior design of the mobile terminal.

Furthermore, damage to the second region 412 formed of the metallic material may be reduced due to the protective layer 205.

Figure 11A:
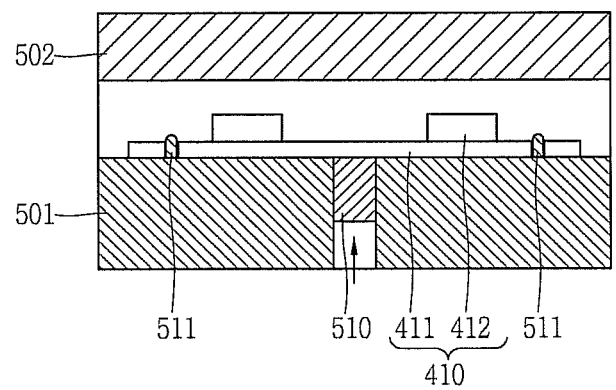
FIGS. 11A through 11C are cross-sectional views illustrating a method of fabricating a battery cover including a rear pattern plate according to an embodiment as broadly described herein.
Figure 11B:
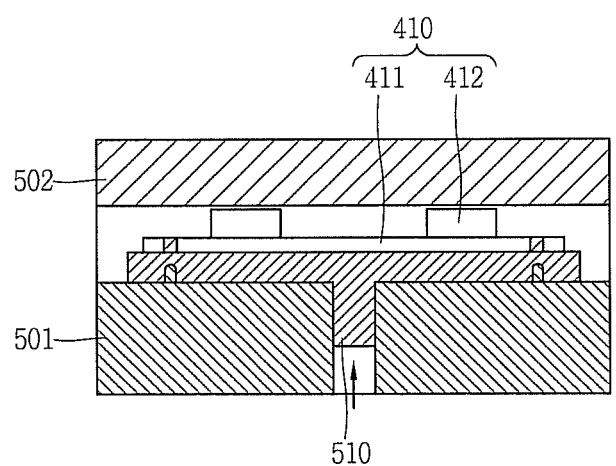
Figure 11C:
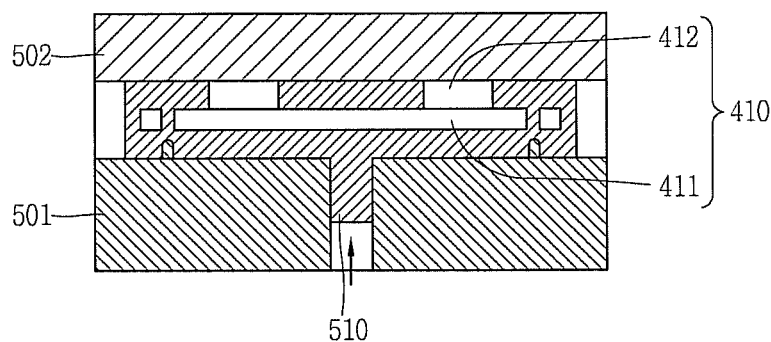

FIGS. 11A through 11C are cross-sectional views of a method of fabricating a battery cover including a rear pattern plate, according to another embodiment as broadly described herein.

A mobile terminal according to this embodiment may include a substantially similar configuration to the mobile terminal of FIG. 8, with the exception of a coupling relationship between the cover portion 204 and the battery cover 103 and a coupling process of the rear pattern plate 410.

Referring to FIG. 11A, the rear pattern plate 410 including the first and second regions 411, 412 is placed on a mold. The mold may include an upper mold 502 and a lower mold 501. The lower mold 501 may include at least one protrusion 511 that protrudes upward toward the upper mold 502.

The upper mold 502 and the lower mold 501 are combined with each other to form an internal space. The rear pattern plate 410 is placed into the internal space. The fixing holes 413 and the protrusions 511 are combined with each other to prevent movement of the rear pattern plate 410.

Referring to FIG. 11B, a mold member 510, or mold material 510, is introduced into the internal space along a path formed in the lower mold 501 to. As the mold material 510 is introduced, it covers a side of the first region 411 at which the second region 411 is not formed, and also extends into the fixing holes 413.

The rear pattern plate 410 moves upward as the mold material 510 is introduced until the second region 412 approaches the upper mold 502, as shown in FIGS. 11B and 11C.

As shown in FIG. 11C, the mold member 510 is not formed at an upper portion of the second region 412.

The mold member 510 is then introduced between the first region 411 and the upper mold 502 to form the case 103.

In other words, in this embodiment the cover portion 204 is incorporated into the case 103, and the rear pattern plate 410 is incorporated into the cover portion 204 and case 103. Accordingly, an additional adhesive member and fixing member are not required.

Furthermore, the mold material forming the mold member 510 completely surrounds the second region 412, and thus a gap between the case 103 and the second region 412 is not formed.

Accordingly, the rear pattern plate 410 may be more firmly formed on the case 103, and the outer surface may be formed in a sleek manner since it does not form a gap on the outer surface.

Furthermore, the formation of the battery cover 103 and the adhesion of the rear pattern plate 410 may be carried out substantially by, for example, an injection molding process, thereby simplifying the process of fabricating the battery cover containing a pattern portion.

Figure 12A:
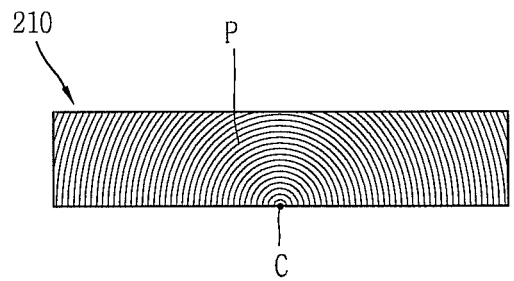
FIGS. 12A through 12C are conceptual views illustrating various patterns implemented on front and rear pattern plates shown in FIG. 4.
Figure 12B:
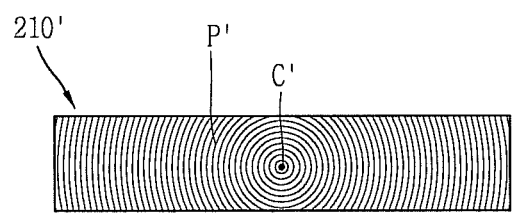
Figure 12C:
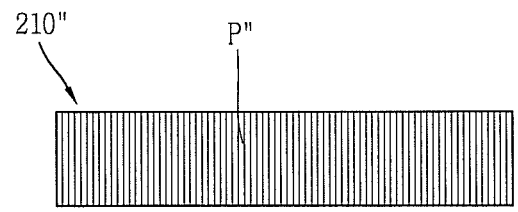

FIGS. 12A through 12C are conceptual views illustrating various patterns (P) which may be implemented on the front and rear pattern plates 210, 410.

Specifically, the pattern (P) may be formed on at least one of a surface of the front pattern plate 210 exposed by the transparent portion 151c' and a surface of the second region 412 of the rear pattern plate 410 exposed to the outside by the opening portion 401. The pattern (P) formed on the front and the rear pattern plate 210, 410 may be implemented in various ways, and may be also applicable to numerous other devices employing such a pattern (P) capable of providing a material feeling to an image.

As illustrated in FIGS. 12A and 12B, the patterns (P, P') have the same center (C, C') and have repeated designs with different sizes. The center (C) is disposed adjacent to a lower surface of the front pattern plate 210 to illustrate the front pattern plate 210 formed with a concentric circle-shaped pattern (P) in FIG. 12A, and the center (C') is disposed at a central portion of the front pattern plate 210' to illustrate the pattern plate 210' formed with a concentric circle-shaped pattern (P') in FIG. 12B.

The locations at which light is reflected are different according to the locations of the center (C, C'), thereby implementing different gloss feelings. Moreover, the center (C, C') may be disposed to correspond to the left and right axes of symmetry of the transparent portion 151c'. Accordingly, the pattern (P) located in the front image (I) is shown in a left/right symmetric manner, thereby providing a balanced feeling.

In FIG. 12C, it is illustrated a pattern plate 210" having a pattern in a shape in which lines are extended in one direction. The pattern plate 210" provides a feeling that can be felt in a cold metallic material.

A mobile terminal including an icon, a logo, or the like is provided.

A mobile terminal as embodied and broadly described herein may include a window, a non-transparent portion, a transparent portion, and a front pattern plate. The window may be mounted to cover at least part of the terminal body and made of an light transmitting material. The non-transparent portion may be disposed to cover a surface of the window. The transparent portion may be restricted by the non-transparent unit on the window to form a front image. The front pattern plate may have a specific pattern, and mounted on the case to expose at least part of the pattern through the transparent portion so as to provide the feeling of a material to the front image.

The non-transparent portion may be printed with the exception of the transparent portion along an edge of the window.

The front pattern plate may include a base formed of a different kind of material from the window and a pattern portion in which a surface of the base is cut to form the pattern.

The front pattern plate may further include a coating layer disposed to cover the pattern portion so as to provide gloss and color to the pattern.

A surface of the front pattern plate may be formed with a concave or convex profile to make the pattern.

The pattern may be formed to have the same center and have repeated designs with different sizes.

The center may be disposed adjacent to a surface of the pattern plate.

The pattern plate may be accommodated in a portion corresponding to the transparent portion on the case, and a receiving portion may be formed in a left/right asymmetric manner to correspond to the pattern plate.

The front image may achieve a logo expressed with the feeling of a patterned material by the front pattern plate.

The mobile terminal may also include a case configured to achieve an external appearance of the terminal body and provided with an opening portion formed with a rear surface image in a region thereof, and a rear pattern plate provided with a first region supported by the case, and a second region protruded to form the shape from a surface of the first region and exposed to the outside by the opening portion.

A recess portion corresponding to a shape of the first region may be formed to place the first region on an inner surface of the case.

An adhesive member may be formed between the first region and the inner surface to fix the first region to the case.

A fixing hole may be formed in the first region to prevent the movement of the rear pattern plate. The case may include a fixing protrusion formed to correspond to the fixing hole.

The mobile terminal may further include a cover portion formed on the case and formed to cover a surface facing an inner portion of the mobile terminal in the first region.

An antenna portion for transmitting and receiving wireless signals may be formed at a surface of the cover portion.

The second region may be formed to make at least one closed loop, and a filling member is filled between the second regions making the closed loop.

The mobile terminal may further include a light transmitting protective layer configured to protect an outer surface of the case and the second region exposed by the opening portion from an external shock.

An outer surface of the case and the second region exposed by the case may be formed to achieve the same plane.

A surface exposed by the opening portion in the second region of the rear pattern plate may be formed with a concave or convex profile to make the pattern.

A mobile terminal according to another embodiment as broadly described herein may include a terminal body, a printing layer, a transparent portion, and a front pattern plate. The terminal body may be provided with a display. The window may be mounted on the terminal body to cover the display, and formed with a light transmitting material. The printing layer may be printed on a rear surface of the window facing the display unit to form a bezel portion surrounding the display. The transparent portion may be restricted by the printing layer to form a front image. The front pattern plate may have a specific pattern, and be mounted on a rear surface of the window to expose at least part of the pattern through the transparent portion so as to provide the feeling of a material on the front image.

A mobile terminal according to still another embodiment as broadly described herein may include an external structure configured to form an external appearance of the terminal body, an exposed region, and a pattern plate. The exposed region may be formed with a preset shape in a region of the assembly structure, and implemented to show an internal portion of the terminal body. The pattern plate may be mounted at an inner portion of the external structure, and at least part of which is overlapped with the exposed region to be identified from the outside of the terminal body and formed with a different material from the external structure.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a body;
   a window coupled to the body to at least partially cover the body, wherein the window is made of a light transmitting material;
   a non-transparent portion covering a predetermined portion of the window;
   a transparent portion provided within the non-transparent portion, the transparent portion defining a front image; and
   a front pattern plate coupled in the body such that a pattern formed on the front pattern plate is at least partially exposed through the transparent portion, and
   wherein the non-transparent portion comprises a printed region that extends along an edge of the window, and the transparent portion comprises a non-printed region within the printed region.

2. The mobile terminal of claim 1, wherein the front pattern plate comprises:
   a base formed of a material that is different from that of the window; and
   a pattern portion provided on a surface of the base to form the pattern, the pattern comprising a plurality of cutaway sections formed in the surface of the base.

3. The mobile terminal of claim 2, wherein the front pattern plate further comprises a coating layer covering the pattern portion so as to provide gloss and color to the pattern.

4. The mobile terminal of claim 1, wherein a surface of the front pattern plate comprises a concave or convex profile forming the pattern.

5. The mobile terminal of claim 1, wherein the pattern comprises a plurality of concentric repeated designs having different sizes.

6. The mobile terminal of claim 5, wherein a center of the plurality of concentric repeated designs is disposed adjacent to an edge of the front pattern plate.

7. The mobile terminal of claim 1, wherein the body comprises a rear case coupled to a front case, and wherein the front pattern plate is received in a receiving portion of the front case corresponding to the transparent portion, and wherein a shape of the receiving portion is asymmetric to correspond to a shape of the front pattern plate.

8. The mobile terminal of claim 1, wherein the front image comprises a logo having a patterned appearance generated by the front pattern plate.

9. A mobile terminal, comprising:
   a body including a display;
   a window coupled to the body and covering the display;
   a printing layer printed on a rear surface of the window facing the display and forming a bezel surrounding the display;
   a transparent portion provided within the printing layer and defining a front image; and
   a first pattern plate coupled to the rear surface of the window such that the pattern is at least partially exposed through the transparent portion provided in the printing layer.

10. The mobile terminal of claim 9, further comprising:
    an opening formed in a surface of the body opposite the window;
    a second pattern plate coupled to an interior of the body corresponding to the opening, the second pattern plate comprising a base and a pattern portion that protrudes outward from the base and into the opening, wherein a shape of the pattern portion corresponds to a shape of the opening, and wherein a portion of the pattern portion exposed through the opening is substantially co-planar with an exterior side of the surface of the body.

11. A mobile terminal, comprising:
    a case that defines an external appearance of a body of the mobile terminal;
    an exposed region formed in a predetermined region of a first side of the case, the exposed region having a predetermined shape to expose a predetermined internal portion of the body, and the exposed region defined by a rear opening formed; and
    a pattern plate provided at an inner portion of the case, wherein the pattern plate at least partially overlaps the exposed region so as to be visible from an outside of the body, and wherein a material of the pattern plate is different from that of the case, and
    wherein the pattern plate a first region supported by the case, and a second region that protrudes from a surface of the first region and is exposed to an outside of the case through the rear opening.

12. A mobile terminal, comprising:
    a case that defines an external appearance of a body of the mobile terminal;
    at least one exposed region formed in a predetermined region of a corresponding side of the case, the at least one exposed region having a predetermined shape to expose a predetermined internal portion of the body; and
    at least one pattern plate provided at an inner portion of the case and at least partially overlapping the corresponding at least one exposed region so as to be visible from an outside of the body, wherein a material of the at least one pattern plate is different from that of the case, and
    wherein the at least one expose region comprises:
    a first exposed region provided within a printed portion of a window that extends across a display provided in the case, wherein the window is made of a light transmitting material, the printed portion forms a non-transparent region on a predetermined portion of the window, and the first exposed region comprises a non-transparent portion provided within the non-transparent region; and
    a second exposed region comprising an opening formed in a side of the case opposite the window.

13. The mobile terminal of claim 12, wherein the at least one pattern plate comprises:
    a first pattern plate installed in the body at a position corresponding to the transparent portion of the non-transparent region such that a first pattern provided on the first pattern plate is visible through the transparent portion; and
    a second pattern plate installed in the case and having a protruded portion that extends into the opening in the side of the case, wherein a shape of the protruded portion corresponds to a shape of the opening, and an exposed surface of the protruded portion and the side of the case are substantially co-planar, and wherein a second pattern provided on the protruded portion of the second pattern plate is visible through the opening.

14. A mobile terminal, comprising:
    a body;
    a window coupled to the body to at least partially cover the body, wherein the window is made of a light transmitting material;
    a non-transparent portion covering a predetermined portion of the window;
    a transparent portion provided within the non-transparent portion, the transparent portion defining a front image; and a front pattern plate coupled in the body such that a pattern formed on the front pattern plate is at least partially exposed through the transparent portion, and wherein the body comprises a case defining an external appearance of the body, wherein the case comprises a rear opening formed in a rear surface thereof defining a rear image, the mobile terminal further comprising a rear pattern plate coupled to the case at a position corresponding to the rear opening, wherein the rear pattern plate comprises a first region supported by the case, and a second region that protrudes from a surface of the first region in a shape of the rear image and is exposed to an outside of the case through the rear opening.

15. The mobile terminal of claim 14, further comprising a recess formed in an inner surface of the case and having a shape corresponding to a shape of the first region so as to receive the first region of the rear pattern plate on the inner surface of the case.

16. The mobile terminal of claim 15, further comprising an adhesive member provided between the first region of the rear pattern plate and the inner surface of the case to fix the first region to the case.

17. The mobile terminal of claim 15, further comprising at least one fixing hole formed in the first region of the rear pattern plate, and at least one corresponding fixing protrusion formed in the case and received in the at least one fixing hole to prevent movement of the rear pattern plate.

18. The mobile terminal of claim 17, further comprising:
a cover formed on the case and covering a surface of the first region of the rear pattern plate facing an inner portion of the mobile terminal such that the rear pattern plate is positioned between the cover and the case.

19. The mobile terminal of claim 18, further comprising an antenna provided at a surface of the cover.

20. The mobile terminal of claim 14, wherein the second region of the rear pattern plate forms at least one closed loop, and a filler is filled between portions of the second region forming the at least one closed loop.

21. The mobile terminal of claim 14, further comprising:
a protective layer provided on an outer surface of the case including the second region of the rear pattern plate exposed through the rear opening formed in the rear surface of the case.

22. The mobile terminal of claim 14, wherein the second region of the rear pattern plate exposed through the rear opening and the rear surface of the case are substantially co-planar.

23. The mobile terminal of claim 14, wherein a surface of the second region of the rear pattern plate exposed through the rear opening in the rear surface of the case comprises a concave or convex profile forming the pattern.

\* \* \* \* \*